United States Patent
Van Spijk et al.

(10) Patent No.: US 7,175,554 B2
(45) Date of Patent: Feb. 13, 2007

(54) HYDRAULICALLY CONTROLLABLE CONSTANT SPEED DRIVE AND METHOD FOR THE DESIGN THEREOF

(75) Inventors: Johannes Gerardus Ludovicus Maria Van Spijk, Drunen (NL); Hendrikus Adrianus Arnoldus Pelders, Warwickshire (GB)

(73) Assignee: Van Doorne's Transmissie B.V., Tilburg (NL)

( * ) Notice: Subject to any disclaimer, the term of this patent is extended or adjusted under 35 U.S.C. 154(b) by 214 days.

(21) Appl. No.: 10/312,734

(22) PCT Filed: Jun. 29, 2001

(86) PCT No.: PCT/EP01/07446

§ 371 (c)(1),
(2), (4) Date: Jun. 16, 2003

(87) PCT Pub. No.: WO02/01095

PCT Pub. Date: Jan. 3, 2002

(65) Prior Publication Data

US 2004/0014539 A1    Jan. 22, 2004

(51) Int. Cl.
 *F16H 55/49* (2006.01)
(52) U.S. Cl. ........................................ 474/46
(58) Field of Classification Search .............. 474/8, 474/11, 17, 18, 28, 46
See application file for complete search history.

(56) References Cited

U.S. PATENT DOCUMENTS

| 3,975,964 | A | * | 8/1976 | Adams .......................... 474/15 |
| 4,229,988 | A | | 10/1980 | Rattunde |
| 6,290,620 | B1 | * | 9/2001 | Tsai et al. ...................... 474/18 |
| 2002/0002089 | A1 | * | 1/2002 | Van Spijk et al. .............. 474/8 |
| 2002/0022542 | A1 | * | 2/2002 | Pfleger et al. ................. 475/45 |

FOREIGN PATENT DOCUMENTS

| DE | 21 36 817 | 9/1972 |
| DE | 197 44 679 | 4/1998 |
| GB | 2 220 038 | 12/1989 |
| JP | 11-2298 | 1/1999 |

\* cited by examiner

*Primary Examiner*—Vicky A. Johnson
(74) *Attorney, Agent, or Firm*—Young & Thompson

(57) ABSTRACT

A hydraulically controllable constant speed drive, includes an input shaft (10) provided with an input pulley (1), an output shaft (20) provided with an output pulley (2) and a drive belt (3). Each pulley (1; 2) is provided with two pulley sheaves (11, 12; 21, 22) that are mutually axially displaceable under the influence of a hydraulic pressure to be exerted in a piston-cylinder assembly (14, 15; 24, 25) associated with the pulley (1, 2) and that define a tapered groove of variable axial width wherein the drive belt (3) is accommodated. An input spring (17) is provided that realizes an axial force urging the pulley sheaves (11, 12) of the input pulley (1) towards each other to prevent slip of the drive belt (3) when the hydraulic pressure is negligible.

11 Claims, 2 Drawing Sheets

PRIOR ART

HYDRAULICALLY CONTROLLABLE CONSTANT SPEED DRIVE AND METHOD FOR THE DESIGN THEREOF

BACKGROUND OF THE INVENTION

The present invention relates to a hydraulically controllable constant speed drive, alternatively denoted as a CSD. Such a CSD is known from GB-A-2.220.038 and is particularly suited for use in a constant frequency generator for conversion of mechanical power into an electrical power, whereby a current frequency and voltage frequency of the electrical power is essentially constant, that is for example used in aviation.

DESCRIPTION OF THE RELATED ART

The known CSD comprises an input shaft to be drivably connected to a drive shaft of a prime mover and with an output shaft to be drivingly connected to a main load such as a main shaft of an electrical generator unit. An input pulley is provided on the input shaft and an output pulley is provided on the output shaft, whereby each pulley comprises two pulley sheaves that are mutually axially displaceable and that together define a tapered annular groove having a variable axial width. The CSD is further provided with a drive belt wrapped around the input and output shafts such that it is partly located in the grooves defined by the pulley sheaves. Each pulley is provided with a piston-cylinder assembly for realizing a variable and predominantly axially oriented force urging the pulley sheaves towards each other. By controlling a hydraulic pressure exerted in a cylinder of the piston-cylinder assembly associated with the input pulley, i.e. the input pressure, and a hydraulic pressure exerted in a cylinder of the piston-cylinder assembly associated with the output pulley, i.e. the output pressure, in a mutually co-ordinated manner, the drive belt may be clamped between the pulley sheaves enabling torque transmission at a particular speed ratio, whereby the speed ratio is defined as a rotational speed of the output shaft divided by the rotational speed of the input shaft. To this end, the CSD is further provided with a control system for determining and subsequently setting the input pressure and the output pressure, whereby the control system includes a hydraulic pump drivable by the prime mover for supplying a flow of pressurized fluid. The control system is arranged to keep a rotational speed of the output shaft virtually constant and to clamp the drive belt sufficiently for torque transmission.

The known CSD has the disadvantage that at initial rotation of the drive shaft of the prime mover, i.e. at start-up, the hydraulic pressure required for clamping the drive belt is still build up by the pump, whereas the input shaft is already driven by the prime mover. It was found that in these circumstances the drive belt may slip between the sheaves of the input pulley and of the output pulley, whereby abrasive wear is prone to occur causing damage to the drive belt and/or the pulley sheaves. Such wear may result in a reduced service life of the CSD and may compromise a maximum torque transmission capacity of the CSD.

SUMMARY OF THE INVENTION

It is an aim of the invention to provide for a CSD, wherein the disadvantageous effects of slip of the drive belt at start-up are mitigated in a reliable manner and at relatively low cost, so that the service life of the CSD is increased. The CSD according to the invention is provided with an input spring realizing a force that urges the pulley sheaves of the input pulley towards each other. In this manner it is advantageously achieved that at start-up the drive belt is clamped between the pulley sheaves of the input pulley, so that even initial rotation of the input shaft is transferred reliably through the drive belt to the generator unit. According to the invention, the axial force to be realized by the input spring to prevent slip of the drive belt, when the hydraulic pressure is still negligible, is surprisingly large. Mainly, because a torque load for overcoming the inertia of the drive belt, the output pulley, output shaft and a main load, i.e. the generator unit, and friction within the drive itself is relatively large, since the main load is directly connected to the drive. It was found that this is particular true in the aviation application of the CSD, where the drive is required to operate reliably in temperature range, including very low temperatures. At such low temperatures the viscosity of the hydraulic fluid used for control and lubrication of the drive is relatively high, adding to the friction within the drive, which needs to be overcome at start-up.

In another embodiment of the invention the CSD is further provided with an output spring realizing a force that urges the pulley sheaves of the output pulley towards each other. The advantage of this embodiment is that the speed ratio of the CSD at start-up may be pre-set by mutually tuning the force realized by the input spring and the force realized by the output spring. It is remarked that, when applied independently from the input spring, the output spring does not seem to provide an adequate solution to the problem underlying the present invention. Although the exact reason thereof is not known with certainty, it is hypothesised that the static friction between drive belt and pulley sheaves is too high for the drive belt to move in radial direction between the pulley sheaves at start-up, which would be required to wedge the drive belt between the pulley sheaves of the input pulley.

According to a further elaboration of the embodiment it is advantageous that the said forces are tuned to set the speed ratio as small as possible at start-up, so that at the initial rotation of the input shaft the rotational speed of the output shaft will be as low as possible. This results in that in the event the control system fails to generate the hydraulic pressure, the rotational speed of the generator unit main shaft and, consequently, the frequency of the electrical current and voltage are also as low as possible. The advantage of such CSD is that the generator unit is protected against over-speeding and possible damage as a result thereof.

The axial forces to be realized by the input spring and by the output spring for preventing slip of the drive belt at start-up, may be determined by increasing the said forces in a ratio whereby the speed ratio of the drive is as small as possible, until slip of the drive belt at start-up is no longer observed.

It is remarked that a transmission with a layout similar to the CSD as described in the above, however, with a differing control system, is known from application in automobiles, wherein the input shaft generally is driven by an engine and the output shaft generally drives a drive axle instead of the generator unit. In such applications a clutch is generally adopted either between the engine and the input shaft, or between the output shaft and the drive axle allowing the engine to run while the drive axle is at a stand still. This means that at start-up the engine is not connected to the main load, i.e. vehicle inertia and driving resistance, and therefore only a negligible amount of torque, if any, will be transmitted by the transmission to overcome the inertia of and friction in the drive itself. This amount of torque is negligible compared to the torque required for driving the main load. It may thus be concluded that the problem underlying the present invention is considerably less relevant in an automotive application of a CSD-like transmission. Moreover, since a range of the speed ratio required for aviation application is typically less than halve the said range required for application in automobiles, characteristics of the CSD for aeronautical application are expected to be radically different, both in terms of layout and in terms of hydraulic control. According to the invention use of the clutch in a constant frequency generator for aeronautical application is undesirable, because it adds design and control complexity, a considerable amount of cost and weight to the CSD, as well as an additional risk of failure. A further advantage of the present invention thus being that a clutch is not required for reliable operation of the constant frequency generator.

The invention further recognizes that with the application of a coil spring in a pulley, whereby such spring is fitted co-axially with the pulley shaft, it tends to slightly deform in a radial direction on rotation of the shaft, as a result of a centrifugal force and of elastic deformation that occurs on compression of the spring. This is particularly true in case of the CSD application of the pulley, where the pulley is rotated at a relatively high speed for relatively long periods of time and where the input spring and the output spring are relatively bulky. A disadvantage of such radial deformation is that the axial force realized by the coil spring may decrease over time, which may lead to slip of the drive belt after all. Accordingly, it is a further aim of the present invention to reduce, or preferably avoid, deformation of the coil spring in radial direction.

According to the invention this aim may be achieved by a pulley as discussed below. In the pulley according to the invention a pulley sheave, which is fitted on a sleeve provided axially movable on the respective pulley shaft, is provided with a flange extending concentrically with the sleeve at a radial position substantially corresponding to an outer radius of the coil spring. At least an end part of the spring will then be radially confined between the sleeve and the flange, limiting the radial deformation thereof. In a preferred embodiment of the pulley according to the invention an axial length of the flange is larger than halve the value of a coil diameter of the coil spring, preferably at least equal to the said coil diameter. In this manner at least the first coil of the coil spring is supported by the flange in a radially outward direction. For an optimum radial confinement of the coil spring, an outer radius of the sleeve substantially corresponds to an inner radius of the coil spring.

In case of a pulley having a piston-cylinder assembly for axially displacing the pulley sheave fitted on the sleeve under the influence of a hydraulic pressure exerted in a cylinder of the assembly, it is known to provided the coil spring inside the said cylinder. In such a case, a piston of the assembly, which is fixed to the movable pulley sheave, may advantageously serve as the flange. Because the inner diameter of the piston is, to a large extend, determined by the axial force to be realized by the hydraulic pressure in the cylinder, it is better feasible to adjust dimensions of the spring to the inner diameter of the piston than the other way around. A material from which the spring is made then needs to be selected such that an elasticity of the spring is adjusted accordingly, in order to realized a certain axial force. This construction of the pulley has the advantages that the coil spring may be radially confined over a relatively large part of its axial length and that the flange is already incorporated in the design of the conventional pulley.

The invention also relates to a constant frequency generator for converting mechanical power into electrical power provided with the constant speed drive according to the invention, whereby the generator comprises an electrical generator unit having a main shaft drivably connected to the output shaft of the CSD. The invention further relates to an aircraft provided with the constant speed drive according to the invention, whereby the aircraft comprises an electrical generator unit having a main shaft drivably connected to the output shaft of the CSD and a prime mover, such as a jet engine, having a drive shaft drivingly connected to the input shaft of the CSD.

The invention still further relates to a method for determining the axial forces to be realized by the input spring and the output spring belt at start-up, i.e. when the hydraulic pressure is negligible, to set the speed ratio of the drive as small as possible and to effectively prevent slip of the drive. The method provides a simple and effective means for the design of the CSD according to the invention. Using the method according to the invention, it was found that an input spring realizing an axial force of less than 0.5 the axial force realized by the output spring typically causes the drive to be pre-set to the smallest speed ratio possible. It was further found that an output spring realizing an axial force of about 3 kN in combination with an input spring realizing an axial force in the range of 1.5 to 1.1 kN typically effects a sufficient clamping of the drive belt between the sheaves of the pulleys for preventing slip of the drive belt at start-up.

BRIEF DESCRIPTION OF THE DRAWINGS

The invention will now further be explained by way of examples given in the accompanying drawing wherein.

DESCRIPTION OF THE PREFERRED EMBODIMENTS

Figure 1:
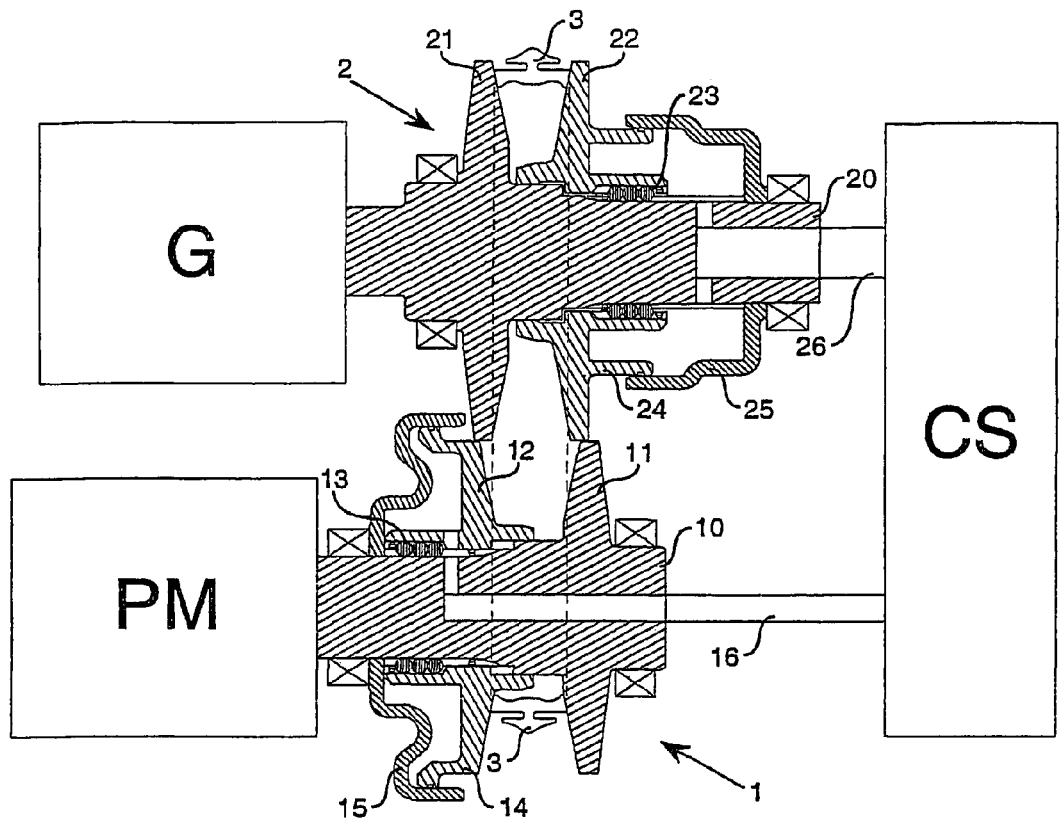
FIG. 1 is a schematic cross section of the known CSD.
Figure 2:
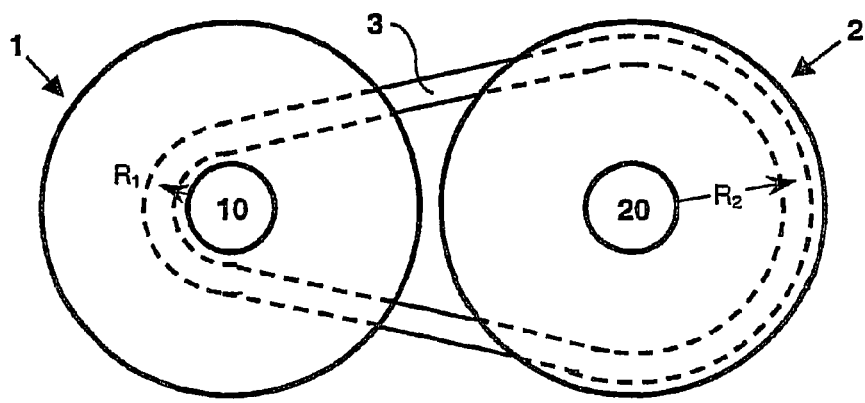
FIG. 2 is a simplified side elevation of the CSD according to FIG. 1.

FIGS. 1 and 2 represent a hydraulically controllable constant speed drive, alternatively denoted as a CSD, according to the known art. The known CSD comprises an input shaft 10 to be drivably connected to a drive shaft of a prime mover PM and with an output shaft 20 to be drivingly connected to a main shaft of an electrical generator unit G. An input pulley 1 is provided on the input shaft 10 and an output pulley 2 is provided on the output shaft 20. Each pulley thereby comprising a pulley sheave 11; 21 that is fixed to the respective pulley shaft 10; 20 and a pulley sheave 12; 22 that is provided axially movable on the respective pulley shaft 10; 20, but fixed in a direction of rotation of the respective pulley shaft 10, 20 by means of a ball-spline 13; 23. For accommodation of the ball-spline 13; 23 and for countering a tendency to tilt with respect to the pulley shaft 10; 20, th movable pulley sheave 12, 22 is fitted on a sleeve 18, 28 of the pulley shaft 10; 20. Accordingly, the pulley sheaves 11 and 12; 21 and 22 of a pulley 1; 2 are mutually axially displaceable and together they define a tapered annular groove having a variable width. The CSD is further provided with a drive belt 3 wrapped around the input shaft 10 and the output shaft 20 such that it is partly located in the V-shaped groove of the pulleys 1; 2. In FIG. 1 the dash-dot lines indicate a trajectory of the drive belt 3.

Each pulley 1; 2 is provided with a piston-cylinder assembly 14, 15; 24, 25 for realizing a variable and predominantly axially oriented force urging the pulley sheaves 11 and 12; 21 and 22 towards each other. By controlling a hydraulic pressure exerted in a cylinder 15 of the piston-cylinder assembly 14, 15 associated with the input pulley 1, i.e. the input pressure, and a hydraulic pressure exerted in a cylinder 25 of the piston-cylinder assembly 24, 25 associated with the output pulley 2, i.e. the output pressure, in a mutually co-ordinated manner, the drive belt 3 may be clamped between the pulley sheaves 11 and 12; 21 and 22 enabling torque transmission at a particular speed ratio, whereby the speed ratio of the drive is defined as a rotational speed of the output shaft 20 divided by the rotational speed of the input shaft 10. The speed ratio is varied by changing the radii $R_1$ and $R_2$ at which the drive belt 3 is located between the sheaves 11, 12 and 21, 22 of the pulleys 1 and 2 under influence of the input pressure and the output pressure. Both in FiG. 1 and in FIG. 2 the CSD is depicted in a transmission state wherein the speed ratio is as small as possible, which means that the running radius $R_1$ is at a minimum and the running radius $R_2$ is at a maximum.

The CSD is also provided with a control system CS for determining and subsequently setting the input pressure and the output pressure, whereby the control system includes a hydraulic pump (not shown) drivable by the prime mover PM for supplying a flow of pressurised fluid. The input pressure in the piston-cylinder assembly 14, 15 of the input pulley 1 is set by the control system CS through via hydraulic line 16, whereas the output pressure in the piston-cylinder assembly 24, 25 of the output pulley 2 is set through via hydraulic line 26. The control system CS is arranged to keep a rotational speed of the output shaft 20 virtually constant and to clamp the drive belt 3 sufficiently for torque transmission without slip of the drive belt 3 between the sheaves 11, 12 and 21,22 of the pulleys 1 and 2.

Figure 3:
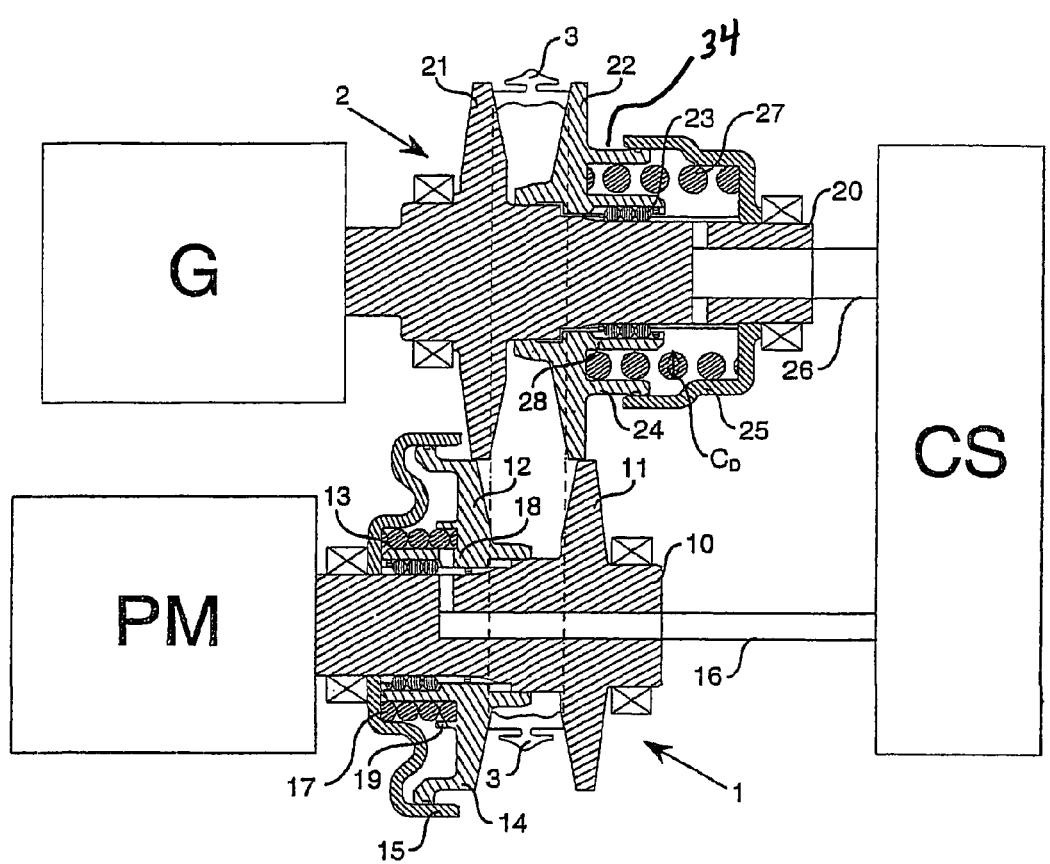
FIG. 3 is a cross section of a CSD according to the invention.

FIG. 3 is an embodiment of the CSD according to the invention. The CSD according to the invention overcomes the problem associated with the known CSD that at start-up of the drive, i.e. at the initial rotations of the prime mover PM, the drive belt 3 is not clamped sufficiently and may therefore slip between the sheaves 11, 12 and 21, 22 of the pulleys 1 and 2. The CSD according to the invention is provided with an input spring 17 realizing a force that urges the pulley sheaves 11 and 12 of the input pulley 1 towards each other. Hereby it is achieved that the drive belt 3 is clamped between the pulley sheaves 11 and 12 of the input pulley 1, so that even the initial rotations of the input shaft 10 are immediately transferred to the drive belt 3. To ensure that at start-up the speed ratio of the CSD is as small as possible, the drive is further provided with an output spring 27 realizing a force that urges the pulley sheaves 21 and 22 of the output pulley 2 towards each other.

FIG. 3 further depicts the application of coil springs 17 and 27, whereby the springs 17 and 27 are fitted co-axially with the respective pulley shaft 10 and 20. To counter deformation of the springs 17 and 27 as a result of a centrifugal force and of elastic deformation, the movable sheaves 12 and 22 are provided with a flange 19 respectively 34 extending concentrically with the respective sleeve 18 and 28 at a radial position substantially corresponding to a outer radius of the respective coil spring 17 and 27. At least an end part of the springs 17 and 27 will then be radially confined between the respective sleeves 18; 28 and flanges 19, 34, limiting the radial deformation thereof.

According to the invention it is to be preferred if an axial length of the flange 19 is at least equal to a coil diameter $C_D$ of the coil spring 17 associated with the said flange 19. For an optimum radial confinement of the coil spring 17; 27, an outer radius of the sleeve 18; 28 substantially corresponds to an inner radius of the coil spring 17, 27 as is the case in FIG. 3.

In a further elaboration of the pulley 2 according to the invention having a piston-cylinder assembly 24, 25 for axially displacing the pulley sheave 22 fitted on the sleeve 28 under the influence of a hydraulic pressure exerted in a cylinder 25 of the assembly 24, 25, a piston 24 of the assembly 24, 25 may advantageously serve as the flange 34. This construction of the pulley 2 according to the invention has the advantages that the coil spring 27 may be radially confined over a relatively large part of its axial length and that the flange 34 is already incorporated in the conventional pulley design. As depicted in FIG. 3, it is also possible to shape the cylinder 25 of the piston-cylinder assembly 24, 25 such that it is provided with a part that has an inner radius, which substantially correspond to the outer radius of the coil spring 27, to further confine the coil spring 27.

The invention claimed is:

1. Hydraulically controllable constant speed drive, comprising:
    an input shaft (10) provided with an input pulley (1),
    an output shaft (20) provided with an output pulley (2), and
    a drive belt (3),
    each of the input pulley (1) and the output pulley (2) provided with two pulley sheaves (11, 12; 21, 22),
    the two pulley sheaves of each pulley comprising a fixed sheave (11, 21) and a displaceable sheave (12, 22) axially displaceable, toward the fixed sheave (11, 22), under the influence of a hydraulic pressure to be exerted in a piston-cylinder assembly (14, 15; 24, 25) associated with the pulley (1, 2),
    each set of the fixed and displaceable sheaves defining a tapered groove of variable axial width wherein the drive belt (3) is accommodated,
    an input spring (17) bearing against the displaceable sheave (12) of the input pulley (1) that realizes an axial force urging the displaceable sheave (12) of the input pulley (1) towards the fixed sheave (12) of the input pulley (1), wherein,
    the drive is configured as an hydraulically controllable constant speed drive with the output shaft driven at a virtually constant rotational speed.

2. Hydraulically controllable constant speed drive according to claim 1, characterised in that the drive is further provided with an output spring (27), bearing against the displaceable sheave (22) of the output pulley (2), that realizes an axial force urging the displaceable sheave (22) of the output pulley (2) towards the fixed sheave (21) of the output pulley (2).

3. Hydraulically controllable constant speed drive according to claim 2, characterised in that the force realized by the input spring (17) and the force realized by the output spring (27) are mutually tuned such that a speed ratio of a rotational speed of the output shaft (20) and the rotational speed of the input shaft (10) is as small as possible, at least when the hydraulic pressure is negligible.

4. Hydraulically controllable constant speed drive according to claim 3, characterised in that the axial force realized by the input spring (17) is less than 0.5 the axial force realized by the output spring (27), at least when the hydraulic pressure is negligible.

5. Hydraulically controllable constant speed drive according to claim 3, characterised in that the axial force realized by the output spring (27) is about 3 kN, at least when the hydraulic pressure is negligible.

6. Hydraulically controllable constant speed drive according to claim 2, characterised in that the force realized by the input spring (17) and the force realized by the output spring (27) are mutually tuned such that a speed ratio of a rotational speed of the output shaft (20) and the rotational speed of the input shaft (10) is as small as possible, at least when the hydraulic pressure is negligible.

7. Hydraulically controllable constant speed drive according to claim 6, characterised in that the axial force realized by the input spring (17) is less than 0.5 the axial force realized by the output spring (27), at least when the hydraulic pressure is negligible.

8. Hydraulically controllable constant speed drive according to claim 1, further comprising:
   a prime mover connected to the input shaft; and
   an electrical generator unit connected to the output shaft, the output shaft driven an virtually constant rotational speed.

9. Method for the design of a constant speed drive controlled by a hydraulic pressure, according to claim 2, the method comprising the steps of,
   determining a minimum axial force to be exerted by the output spring (27) for enabling transmission of a maximum torque occurring on the output shaft (20) at start-up of the drive when the hydraulic pressure is negligible, while a speed ratio, which is defined as a rotational speed of the output shaft (20) divided by a rotational speed of the input shaft (10), of the drive is at a minimum, and;
   determining a maximum axial force exertable by the input spring (17) when the said minimum axial force is exerted by the output spring (27), while the speed ratio of the drive is at a minimum.

10. Method of claim 9, wherein the input spring and the output spring are sized to bear against the displaceable sheaves so as to prevent slip of the drive belt at start-up of a drive when the hydraulic pressure is negligible and a main load is directly connected to the drive.

11. Hydraulically controllable constant speed drive, comprising:
   an input shaft (10) provided with an input pulley (1);
   an output shaft (20) provided with an output pulley (2);
   a drive belt (3),
   the input pulley (1) and the output pulley (2) each provided with two pulley sheaves (11, 12; 21, 22) comprising a fixed sheave (11, 21) and a displaceable sheave (12, 22) axially displaceable toward the fixed sheave (11, 22) under influence of a hydraulic pressure of a piston-cylinder assembly (14, 15; 24, 25) associated with the pulley (1, 2),
   each set of the fixed and displaceable sheaves defining a tapered groove of variable axial width wherein the drive belt (3) is accommodated;
   an input spring (17) bearing against the displaceable sheave (12) of the input pulley (1) to provide an axial force urging the displaceable sheave (12) of the input pulley (1) towards the fixed sheave (12) of the input pulley (1); and
   an output spring (27) bearing against the displaceable sheave (22) of the output pulley (2) to provide an axial force urging the displaceable sheave (22) of the output pulley (2) towards the fixed sheave (21) of the output pulley (2), wherein,
   the force provided by the input spring (17) and the force provided by the output spring (27) are mutually tuned such that a speed ratio of a rotational speed of the output shaft (20) and the rotational speed of the input shaft (10) is as small as possible when the hydraulic pressure is negligible, and
   the drive is configured as an hydraulically controllable constant speed drive with the output shaft driven at a virtually constant rotational speed.

* * * * *